Dec. 22, 1959 W. R. ERVIN 2,918,162
HAY BALER LOADING ATTACHMENT
Filed Nov. 19, 1956 3 Sheets-Sheet 1
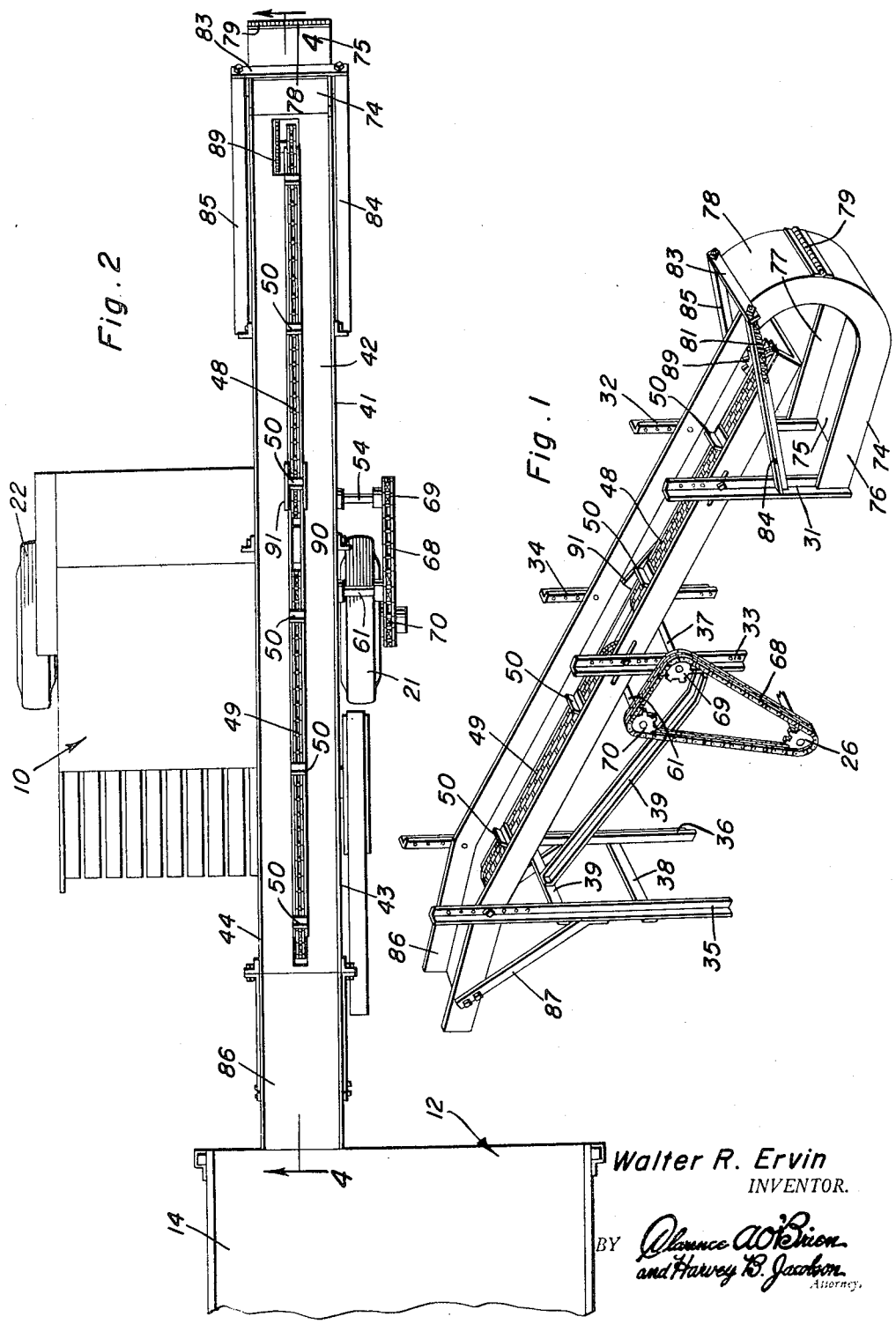
Walter R. Ervin
INVENTOR.

Dec. 22, 1959 W. R. ERVIN 2,918,162
HAY BALER LOADING ATTACHMENT
Filed Nov. 19, 1956 3 Sheets-Sheet 2
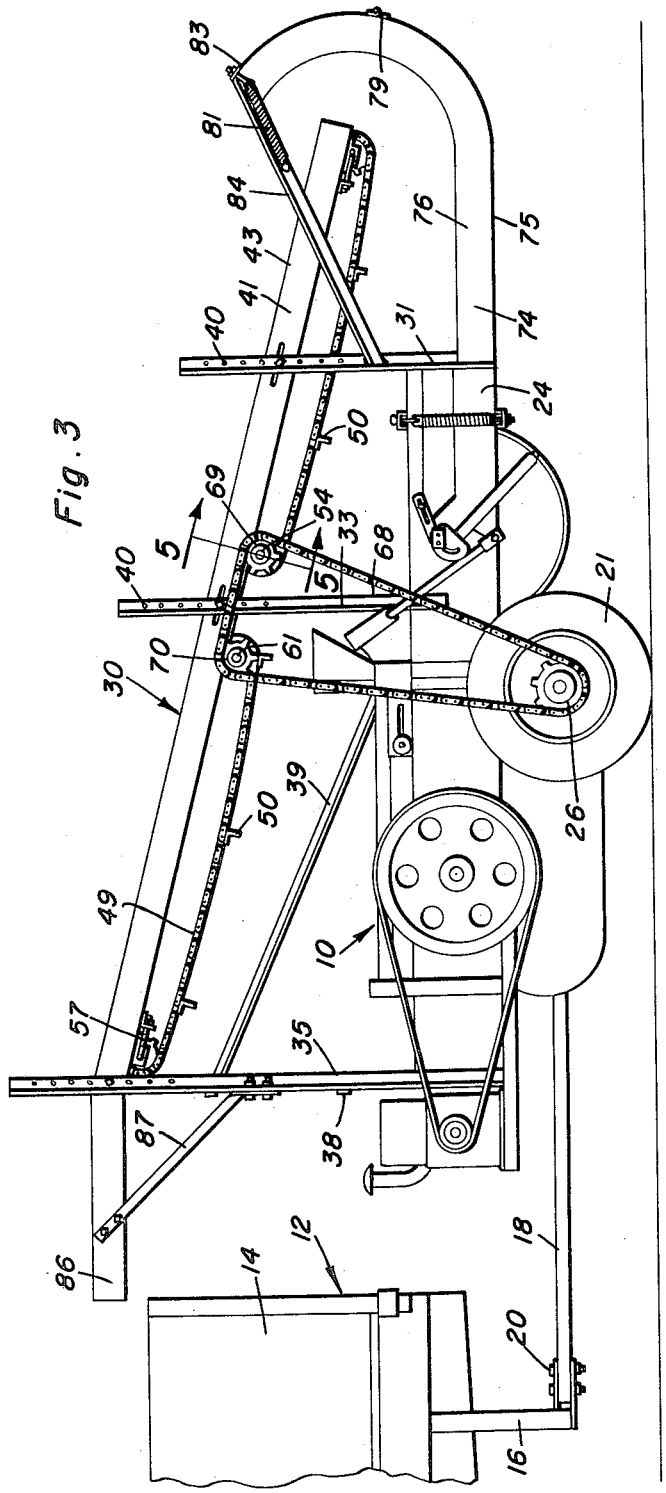
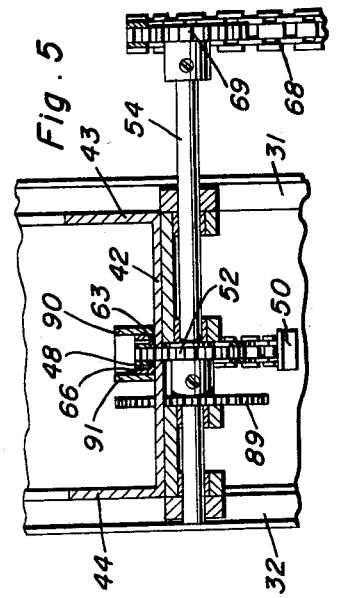
Walter R. Ervin
INVENTOR.

Dec. 22, 1959 W. R. ERVIN 2,918,162
HAY BALER LOADING ATTACHMENT
Filed Nov. 19, 1956 3 Sheets-Sheet 3
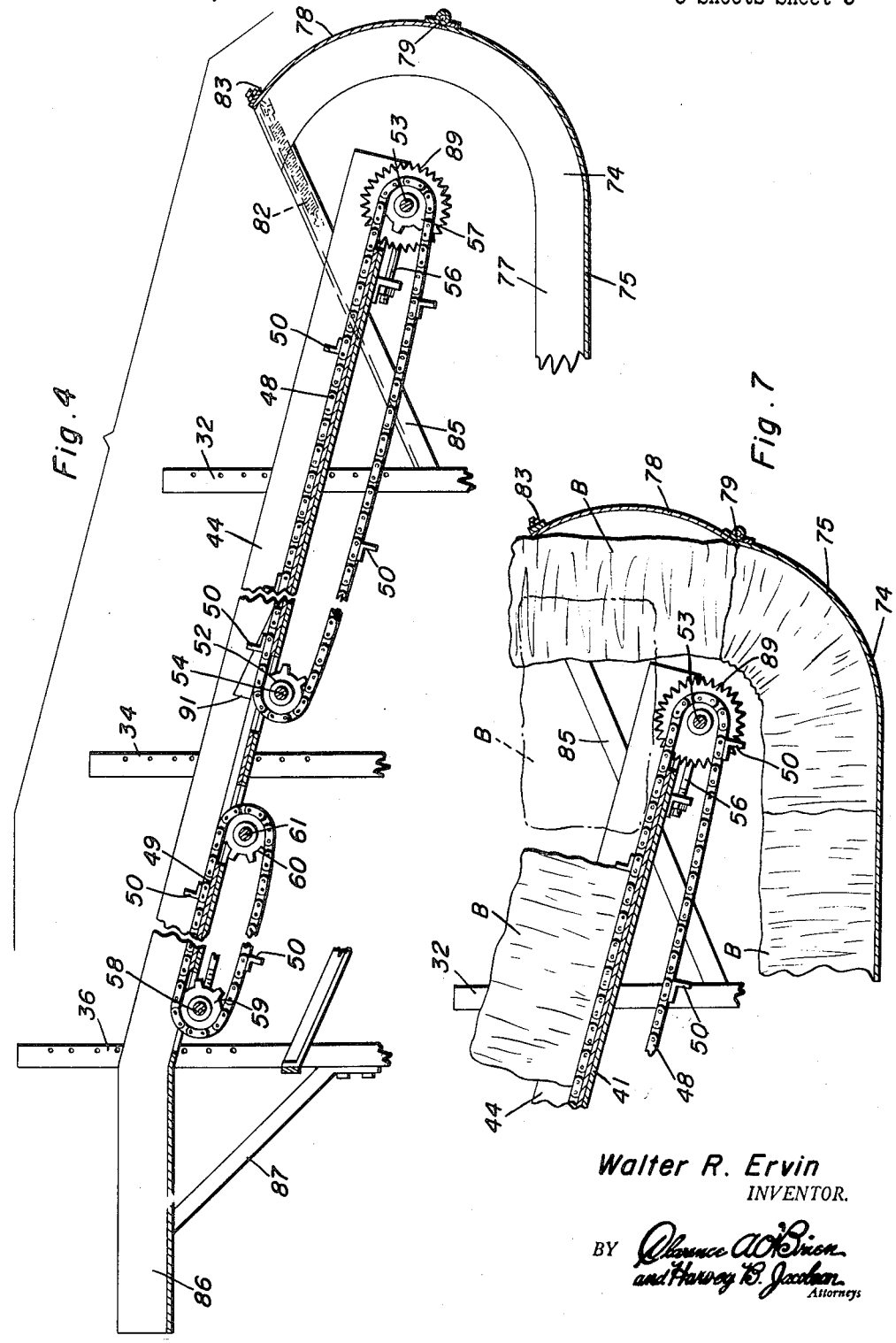
Walter R. Ervin
INVENTOR.

United States Patent Office 2,918,162
Patented Dec. 22, 1959

2,918,162

HAY BALER LOADING ATTACHMENT

Walter R. Ervin, Petersburg, W. Va.

Application November 19, 1956, Serial No. 622,925

7 Claims. (Cl. 198—33)

This invention relates to attachments for hay balers and more particularly to a hay baler loader.

An object of the present invention is to provide an attachment for an ordinary hay baler which is capable of automatically receiving the bales after they are formed and delivering them to a higher elevation for discharge onto a truck, wagon or other conveyance.

A further object of the present invention is to provide an attachment for a hay baler which will eliminate the services of several men. With regard to this, it is a common practice to pull a hay baler through a field of hay and discharge the bales directly onto the ground. Thereafter a crew together with a wagon follows the baler with the crew picking up the bales and depositing them onto the truck, wagon or other conveyance. Accordingly, the attachment which exemplifies the invention delivers the hay bales automatically from the discharge end of the hay baler onto the wagon or other conveyance. It is mentioned that the repository for the bales may be wagon or other conveyance. It is contemplated that the same truck which pulls the hay baler through the field may be used to receive the bales and thereby dispensing with the necessity of having a tractor, truck or other vehicle for the sole purpose of pulling the trailer or wagon through the fields for collection of the bales.

A more particular object of the present invention is to provide an attachment for a hay baler which is capable of being secured directly onto the hay baler, the attachment including means to direct the baled hay onto an endless conveyor, the latter extending coincident with the longitudinal axis of the hay baler and returning the hay bales in the direction of travel of the hay baler and onto the towing motor vehicle of the hay baler.

A further object of the present invention is to provide an attachment for a hay baler which delivers the bales to a common location, for example on the wagon body or truck body of the towing vehicle, the attachment being automatically responsive for its operation, to the forward motion of the hay baler through the field.

Another object of the present invention is to provide a practical device for delivering hay bales directly from the hay baler onto a wagon, truck or the like. Although in the past, various and sundry conveyors have been conceived, developed and used in connection with farming, t by knowledge, the attachment which I have provided on a hay baler is the first attempt to utilize an ordinary, conventional hay baler in such manner that it delivers the bales and they are, instead of handled manually or dropped onto the ground, delivered to a wagon, truck or other conveyance. This saves an entire operation in the handling of the bales of the hay and moreover, it preserves the hay.

With regard to the previously mentioned saving of hay bales, it is a present practice to permit the hay bale to be discharged from the hay baler directly onto the ground. Once in awhile before the hay bales can be collected, it rains. The hay then becomes wet, mildewed and is damaged. By use of the attachment on the hay baler which constitutes an embodiment of the invention, this possibility of damage to the hay is completely obviated inasmuch as the hay bales are never discharged directly onto the ground and moreover, they are never left to be wet either by rain, dew or by other means.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of a hay baler attachment which is constructed in accordance with the invention;

Figure 2 is a top plan view of the attachment on a hay baler which is being drawn by a truck;

Figure 3 is a side view of the attachment and baler in Figure 2;

Figure 4 is a longitudinal sectional view taken on the line 4—4 of Figure 2;

Figure 5 is an enlarged sectional view taken on the line 5—5 of Figure 3 and showing one end of one of the conveyors which delivers the hay bales up and inclined passageway for deposit onto a conveyance;

Figure 6 is a fragmentary sectional view showing a hay bale being elevated slightly so as to be separated from its driving cleat on one of the conveyors; and Figure 7 is an enlarged fragmentary sectional view showing a hay bale being guided onto the upwardly inclined endless conveyor for discharge onto a conveyance, preferably the same conveyance that pulls the hay baler through the hay field.

In the accompanying drawings there is a standard hay baler 10 which is being drawn through a field by a motor vehicle, as truck 12 which has a truck body 14 and drawbar 16 to which tongue 18 of the hay baler is attached. The attachment is preferably made for quick disconnection, for example a single or plurality of pins 20 pass through aligned apertures in the tongue 18 and drawbar 16. Hay baler 10 is of absolutely standard construction and includes among other conventional parts immediately recognizable from an inspection of Figure 3, a pair of wheels 21 and 22 and a discharge chute 24 at the rear end of the baler. Wheel 21 has the one-way drive sprocket 26 operatively connected therewith. When the hay baler is moved in the forward direction, sprocket 26 drives, however, when the hay baler is moved in a reverse direction, the sprocket 26 ratchets, that is, does not rotate due to the one-way clutch which couples the sprocket 26 with the wheel 21 or the axle on which the wheel is mounted.

Attachment 30 for the hay baler is mounted above the hay baler and secured rigidly thereto by means of upright supports 31, 32, 33, 34, 35 and 36, each of which is suitably braced by means of transverse members as at 37, 38 and 39. The upper ends of all of the upright supports are provided with a plurality of apertures 40 so that the conveyor trough 41 may be adjusted to any selected angularity. Conveyor trough 41 has a bottom 42 and a pair of sides 43 and 44, the cross section being a channel. Bolts connect the trough to the three pairs of uprights, the bolts through slots in the sides of the channel for facility in adjusting the angularity thereof.

There are two endless conveyors 48 and 49 which are mounted in the trough 41, the two endless conveyors being in axial alignment with each other. It is preferred that the conveyors be made of chains and that there be spaced cleats 50 secured to each endless conveyor, the purpose of the cleats being to drivingly connect to the hay bales and propel them forwardly and upwardly within the trough 41.

Conveyor 48 has its chain mounted on sprockets 51 and 52 respectively which are on axles 53 and 54, the latter being in suitable bearings and are carried by the bottom 42 of the trough 41. A threaded tightener 56 for the endless conveyor 48 is carried by the trough 41 and is operatively connected to the axle 53 in the usual manner in order to tighten the chain of the conveyor 48. A similar tightener 57 for the endless conveyor 49 is also carried by the trough and serves a similar purpose being operatively connected to the axle 58 of endless conveyor 49. This is the upper axle which is mounted in bearings on the bottom of the trough and supports the sprocket 59 of the endless conveyor 49 and around which the chain thereof is entrained. The sprocket 60 of conveyor 49 is attached to axle 61, the latter being carried by bearings on the trough 41. All of the sprockets of the conveyors are passed through openings in the bottom 42 of the trough 41 so that they support the upper flight of the conveyors within the trough. For example, see opening 63 for the sprocket 52 (Figure 5) which locates the chain of conveyor within channel 66 that extends longitudinally of and coincident with the central axis of the trough 41. Both conveyors 48 and 49 are mounted in the channel 66.

There are means drivingly connecting the sprocket 26 with the two endless conveyors. These means consist of a chain 68 which is entrained around the socket 26 and around sprockets 69 and 70 which are fixed onto axles 54 and 61 of the two conveyors 48 and 49. Accordingly, at all times that the baler 10 is moved forwardly the two conveyors 49 and 50 are actuated. This means that during normal operation of the baler, hay bales are discharged at the rear of the baler through channel 24. Constituting a part of the attachment is a curved guide 74 that is channel-shaped in cross section, including a bottom 75 and two sides 76 and 77. In addition the guide 74 has a curved part adapted and arranged to discharge the bales onto the inlet of the conveyor 41. A part of the bottom is formed as a baffle 78, being connected by hinge 79 to the remaining part of the bottom 75 of guide 74. A pair of springs 81 and 82 are secured to the outer extremity of a cross bar 83 on the baffle 78 and are secured to the two braces 84 and 85 which extend from sides 76 and 77 of guide 74 to the two upright supports 31 and 32.

There is an approximately horizontal part 86 of the trough 41 at the discharge end thereof, this approximately horizontal part 86 being braced as at 87 to the two upright supports 35 and 36. In operation the hay baler 10 is actuated in the customary manner. As the bales B are discharged, they are accepted by guides 74 and are pushed upwardly around the arcuate part of the guide by the force derived from the pushing of the successive bales from the baler 10. As the bale B moves upwardly in the arcuate guide 74 (Figure 7) the spring opposed movement of baffle 78 occurs until the bale is approximately upright at which time the springs 84 and 82 apply sufficient force to the baffle 78 to push the baffle and the bale forwardly of the baler. This topples the bale B onto the inlet end of the trough 41 and it is received on the first conveyor 48. A toothed wheel 89 is fixed to the axle 53 of the conveyor 48 and helps to propel the bale for the initial push up the trough 41 until engaged by one of the cleats 50 and carried upwardly. As the bale reaches the end of the conveyor 48 and is elevated by riding up the pair of spaced elevators 90 and 91 which are fixed to the bottom 42 of the trough 41 and are on opposite sides of the channel 66. The lifting of a typical bale B by the elevators 90 and 91 is shown in Figure 6. Then, the bale B moves onto the conveyor 49 and is finally discharged directly in the body of the towing vehicle 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use with a hay baler, an attachment comprising an endless conveyor, upright supports securing said endless conveyor to the baler, a guide in registry with the discharge end of the baler and in registry with the inlet end of the conveyor so that the bales from the baler are guided onto the conveyor, said guide having a curved part which rises vertically upwardly in order to elevate the bales, and means connected with said curved part of said guide for applying force in such direction as to topple the bales onto the endless conveyor.

2. For use with a hay baler, an attachment comprising an endless conveyor, upright supports securing said endless conveyor to the baler, a guide in registry with the discharge end of the baler and in registry with the inlet end of the conveyor so that the bales from the baler are guided onto the conveyor, said guide having a curved part which rises vertically upwardly in order to elevate the bales, means connected with said curved part of said guide for applying force in such direction as to topple the bales onto the endless conveyor and including a baffle hingedly connected to said guide, and springs connected to said baffle and arranged to oppose the movement of said baffle in one direction.

3. For use with a hay baler, an attachment comprising an endless conveyor, upright supports securing said endless conveyor to the baler, a guide in registry with the discharge end of the baler and in registry with the inlet end of the conveyor so that the bales from the baler are guided onto the conveyor, said guide having a curved part which rises vertically upwardly in order to elevate the bales, means connected with said curved part of said guide for applying force in such direction as to topple the bales onto the endless conveyor, said conveyor including a conveyor chain, cleats carried by said conveyor chain, and means to elevate the bales with respect to the conveyor as they approach an end of said chain in order to separate the bales from the cleats on said chain.

4. The attachment of claim 3 wherein said conveyor is arranged an angle to the longitudinal axis of the baler, and a portion of said conveyor from which the bales are discharged is approximately horizontal.

5. An attachment for a hay baler comprising a plurality of upright supports, a trough carried at an angle by said supports, at least one endless conveyor mounted in said trough, cleats on said endless conveyor to propel bales upwardly in the trough, a guide attached to at least one of said upright supports and arranged to deliver bales from the discharge end of the baler onto said trough, said guide having an arcuate portion which delivers the bale upwardly and over the top of the trough so as to topple thereon, spring biased means for applying force directly to the top of the bales onto the trough, a tooth wheel mounted for rotation at the inlet end of said trough to apply an initial propulsion to the bales in a direction to move them onto said conveyor as they leave said guide and are accepted within said trough.

6. In an attachment for a hay baler which has a conveyor and a guide adapted to register with the discharge end of the baler and in registry with the inlet end of said conveyor, the improvement comprising means operatively associated with said guide for toppling the bales from said guide onto said conveyor, said bale toppling means including a baffle, means hingedly mounting said baffle on the guide, and a spring reacting on said baffle to oppose the movement of said baffle in one direction and to apply a spring force onto the baffle for toppling the bales over onto said conveyor.

7. The attachment of claim 6 wherein there are means at the inlet end of said conveyor for initially propelling the bales after they topple onto the inlet end of the conveyor, a second conveyor in tandem with the first mentioned conveyor, and means for elevating the bales as they move from the first conveyor onto the second conveyor.

References Cited in the file of this patent

UNITED STATES PATENTS

| | | |
|---|---|---|
| 1,570,256 | Hunt | Jan. 19, 1926 |
| 2,325,833 | Cook | Aug. 3, 1943 |
| 2,551,427 | Ellefson | May 1, 1951 |
| 2,563,427 | Scott | Aug. 7, 1951 |
| 2,580,633 | Williams | Jan. 1, 1952 |
| 2,616,551 | Harris | Nov. 4, 1952 |
| 2,650,690 | Hume | Sept. 1, 1953 |
| 2,702,131 | Leupke | Feb. 15, 1955 |
| 2,765,901 | Smoker | Oct. 9, 1956 |